(12) United States Patent
Hildebrant

(10) Patent No.: US 7,146,539 B2
(45) Date of Patent: Dec. 5, 2006

(54) SYSTEMS AND METHODS FOR TESTING A DEVICE-UNDER-TEST

(75) Inventor: Andrew S. Hildebrant, Loveland, CO (US)

(73) Assignee: Verigy IPco, Singapore (SG)

( * ) Notice: Subject to any disclaimer, the term of this patent is extended or adjusted under 35 U.S.C. 154(b) by 548 days.

(21) Appl. No.: 10/620,191

(22) Filed: Jul. 15, 2003

(65) Prior Publication Data
US 2005/0039099 A1   Feb. 17, 2005

(51) Int. Cl.
G06F 11/00 (2006.01)
(52) U.S. Cl. .......................... 714/30; 714/733
(58) Field of Classification Search ............ 714/25, 714/29, 30, 33, 733
See application file for complete search history.

(56) References Cited

U.S. PATENT DOCUMENTS

| | | | |
|---|---|---|---|
| 6,073,264 A * | 6/2000 | Nelson et al. | 714/738 |
| 6,532,561 B1 * | 3/2003 | Turnquist et al. | 714/738 |
| 6,651,204 B1 * | 11/2003 | Rajsuman et al. | 714/738 |
| 2002/0073374 A1 * | 6/2002 | Danialy et al. | 714/738 |

* cited by examiner

Primary Examiner—Dieu-Minh Le

(57) ABSTRACT

A method for testing a device-under-test (DUT) includes examining a test data file that includes test data for testing the structure, functionality and/or performance of the DUT. The method also includes separating a first plurality of data units from a second plurality of data units contained in the test data file. The first plurality of data units correspond to a first plurality of DUT pins, and the second plurality of data units correspond to a second plurality of DUT pins.

20 Claims, 5 Drawing Sheets

US 7,146,539 B2

SYSTEMS AND METHODS FOR TESTING A DEVICE-UNDER-TEST

BACKGROUND

Testing the structure of an electronic device, such as, for example, a microprocessor, typically requires providing the device with input and then checking the device's output to determine if there are any defects. For some devices-under-test (DUTs), input is provided to both scan-pins and non-scan-pins of the DUT. The scan-pins are typically connected to specific internal structures of the DUT and receive substantially more test data than the non-scan-pins (which typically only receive set-up data and a repeated data pattern). Data provided to scan-pins is typically formatted independently from data provided to non-scan pins. Therefore, a user of a testing device may be required to identify the scan-pins manually and then provide pin-identification information to the testing device. As a result, testing the structure of an electronic device may be very costly and time consuming. Therefore, there exists a need for systems and methods for addressing these and/or other problems associated with testing an electronic device.

SUMMARY

An embodiment of a method for testing a device-under-test (DUT) includes examining a test data file that includes test data for testing the DUT, and separating a first plurality of data units from a second plurality of data units contained in the test data file. The first plurality of data units correspond to a first plurality of DUT pins, and the second plurality of data units correspond to a second plurality of DUT pins.

An embodiment of a system for testing a DUT includes memory operative to store a test data file that includes data for testing the DUT, and a processor that is programmed to separate a first plurality of data units from a second plurality of data units contained in the test data file.

Other systems, methods, features and/or advantages will be or may become apparent to one with skill in the art upon examination of the following figures and detailed description. It is intended that all such additional systems, methods, features, and/or advantages be included within this description and be protected by the accompanying claims.

BRIEF DESCRIPTION OF THE DRAWINGS

In the drawings, like reference numerals designate corresponding parts throughout the several views. Furthermore, the components in the drawings are not drawn to scale.

DETAILED DESCRIPTION

As will be described in more detail, test data within a test data file are separated based on one or more properties of the test data. For example, a first set of data corresponding to scan-pins of a device-under-test (DUT) is separated from a second set of data corresponding to non-scan pins of the DUT. In this manner, the first and second sets of data may be formatted independently from each other and/or may be provided to testing resources operating in different timing domains. The testing resources may then use the respective sets of data to test the structure, functionality and/or performance of the DUT.

Figure 1A:
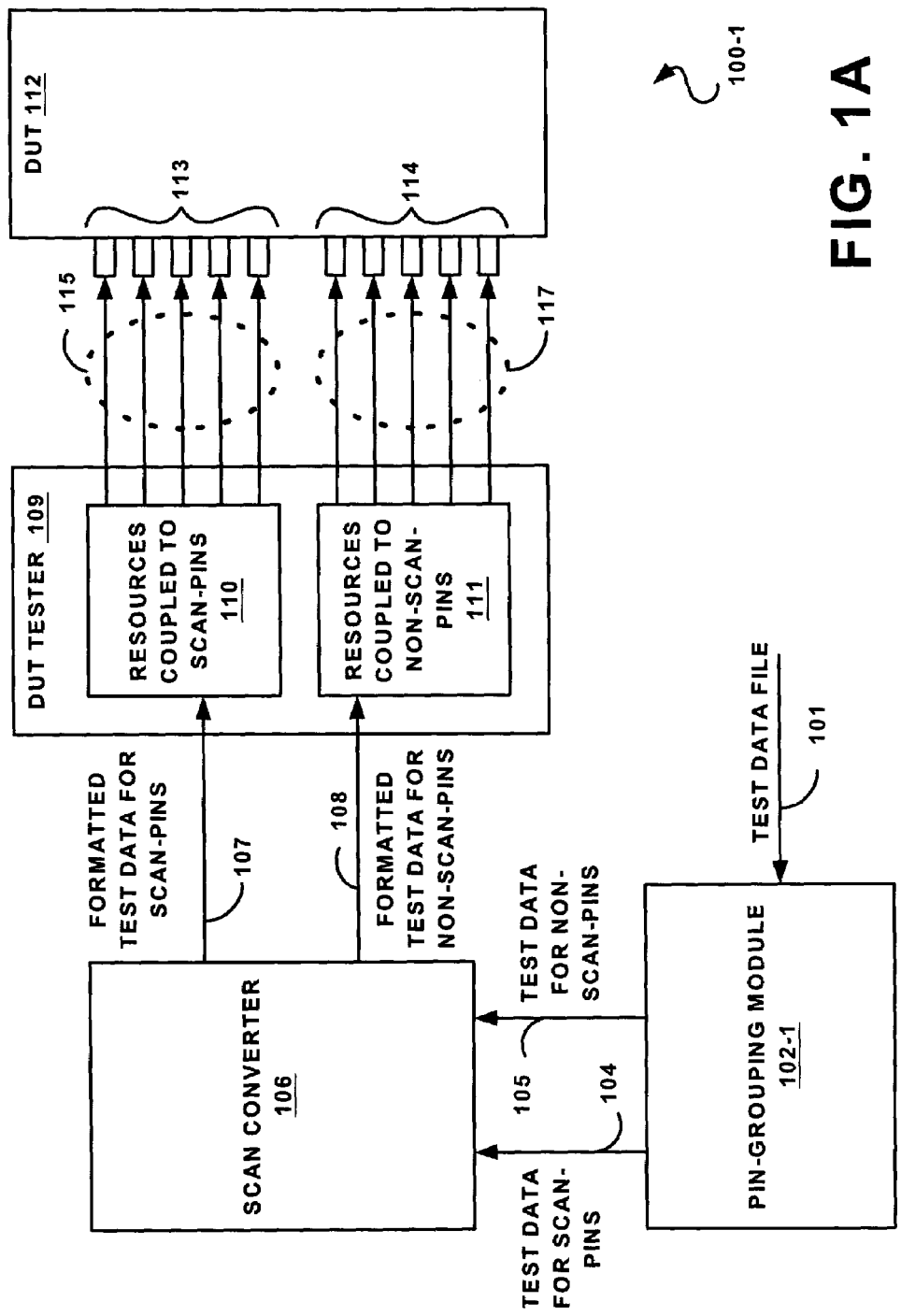
FIG. 1A is a block diagram depicting an embodiment of a testing system.

FIG. 1A is a block diagram depicting an embodiment of a testing system 100-1. The testing system 100-1 includes a pin-grouping module 102-1 for separating test data corresponding to scan-pins 113 from test data corresponding to non-scan-pins 114. The pin-grouping module 102-1 receives a test data file 101 comprising test data corresponding to scan-pins 113 and test data corresponding to non-scan-pins 114. The format of the test data file 101 may be, for example, STIL (standard test interface language) or WGL (waveform generation language), among others. From the test data file 101, the pin-grouping module 102-1 separates test data 104 corresponding to scan-pins 113 from test data 105 corresponding to non-scan-pins 114, and provides the test data 104 to a scan converter 106 separately from the test data 105. For example, the test data 104 may be provided to the scan converter 106 before and/or after the test data 105.

The scan converter 106 formats the test data 104 and 105 to produce formatted test data 107 and 108, respectively, that are subsequently provided to a DUT tester 109. The formatted test data 108 has different properties than the formatted test data 107, including, for example, different timing complexity, vector data volume, and repetitiveness, among others. The DUT tester 109 includes resources 110 coupled to scan-pins 113 of a DUT 112, and resources 111 coupled to non-scan-pins 114 of the DUT 112. The resources 110 may operate in a different timing domain than the resources 111. For example, the resources 110 may include processors running at a first clock speed, and the resources 111 may include processors running at a second clock speed. The resources 110 receive the formatted test data 107 and provide or receive corresponding test signals 115 to or from scan-pins 113. On the other hand, the resources 111 receive the formatted test data 108 and provide or receive corresponding test signals 117 to or from non-scan-pins 114.

Figure 1B:
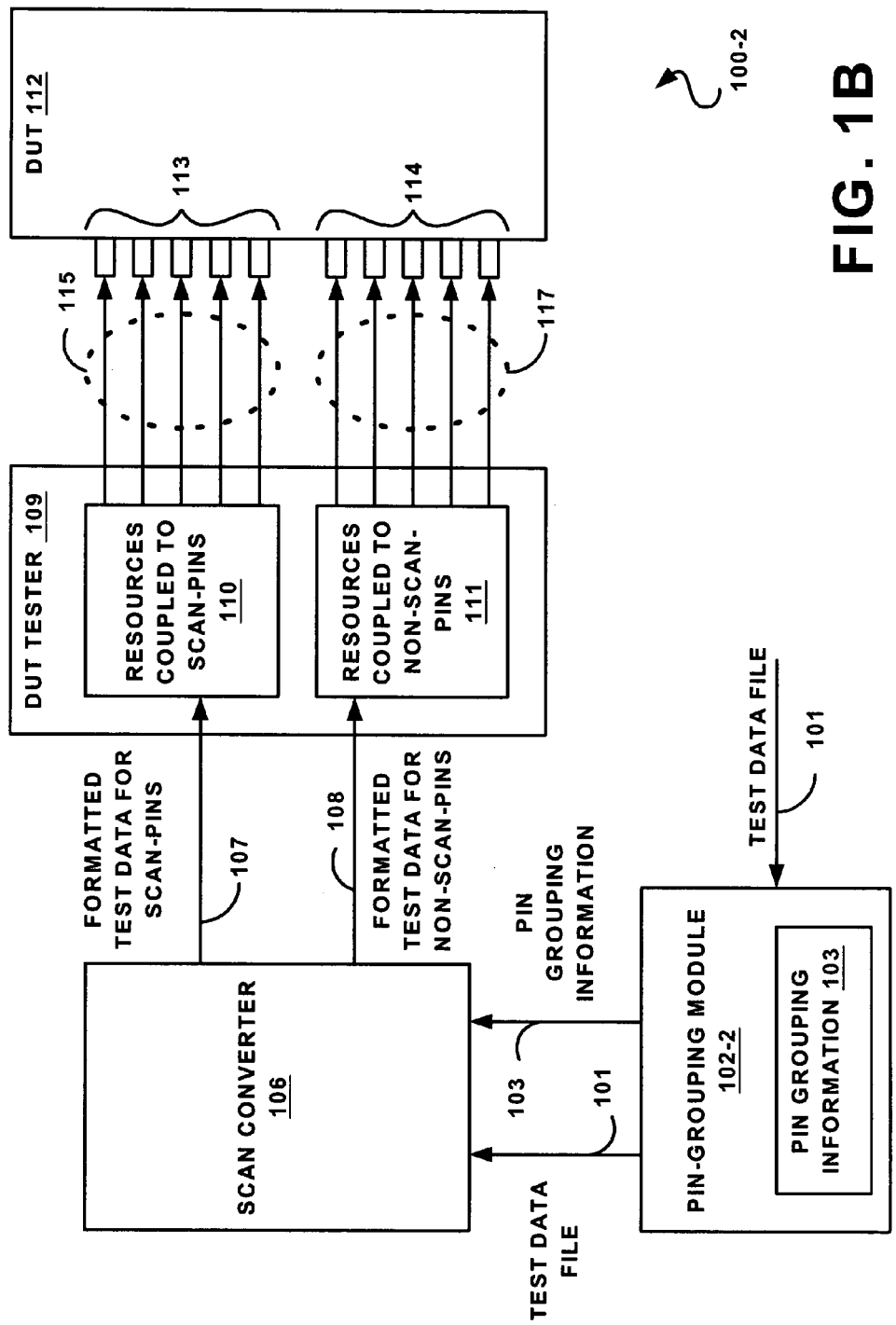
FIG. 1B is a block diagram depicting another embodiment of a testing system.

FIG. 1B is a block diagram depicting an embodiment of a testing system 100-2. The pin-grouping module 102-2 receives a test data file 101 and uses the test data file 101 to create pin-grouping information 103 identifying scan-pins 113 and/or non-scan-pins 114 of the DUT 112. The pin-grouping module 102-2 then provides the pin-grouping information 103 and the test data file 101 to the scan converter 106. The scan converter 106 uses the pin-grouping information 103 to format test data (within the test data file 101) corresponding to scan-pins 113 separately from test data corresponding to non-scan-pins 114. The scan converter 106 then provides formatted test data 107 (corresponding to scan-pins 113) and formatted test data 108 (corresponding to non-scan-pins 114) to the DUT tester 109. The DUT tester 109 may, for example, be configured to operate as described in reference to FIG. 1A.

Figure 2:
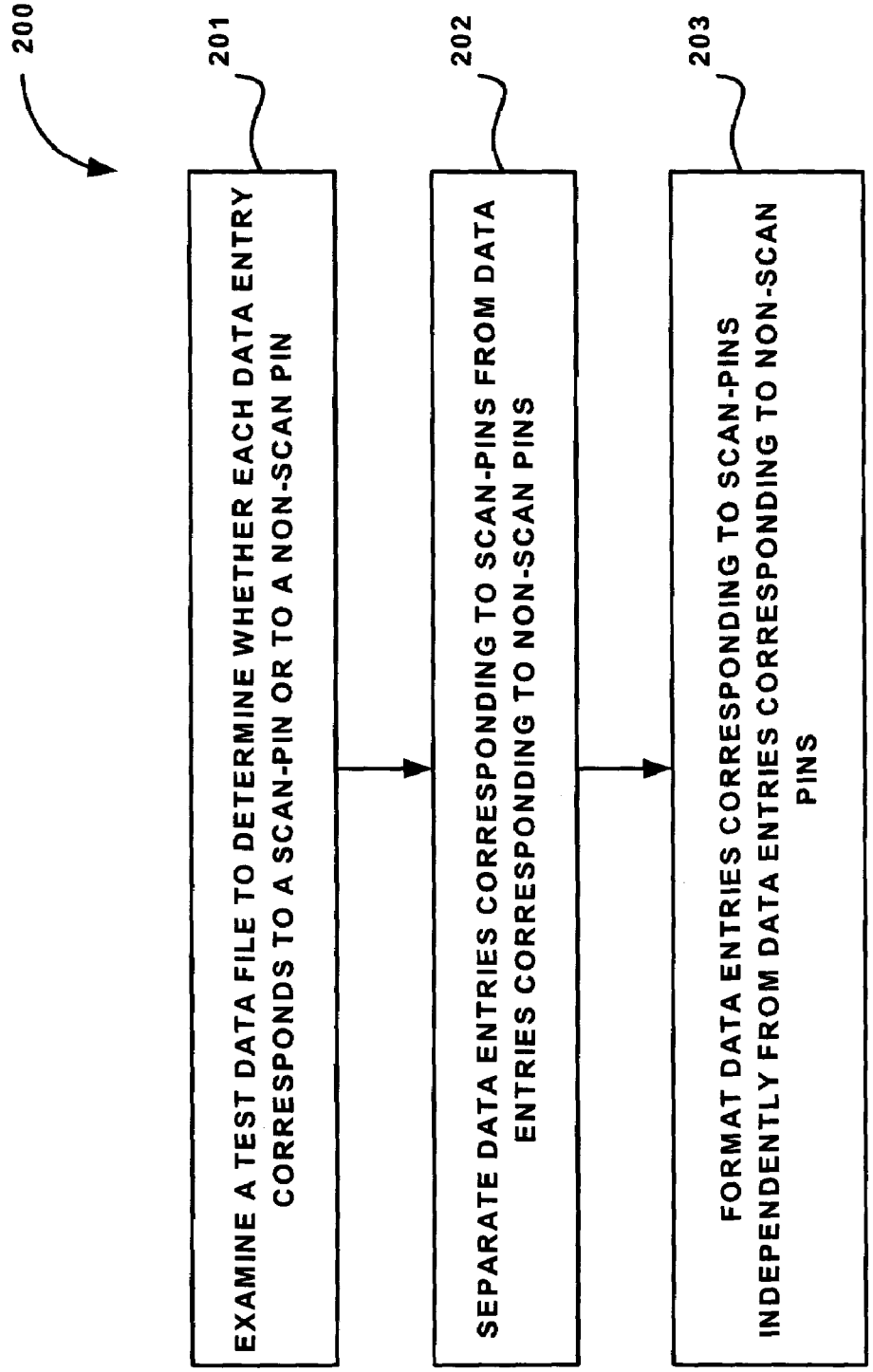
FIG. 2 is a flow chart depicting an embodiment of a testing method.

FIG. 2 is a flow chart depicting an embodiment of a testing method 200. As indicated in block 201, a test data file 101 (FIG. 1A) is examined to determine whether each data entry in the test data file 101 corresponds to a scan-pin 113 or to a non-scan-pin 114. For example, in a STIL file, a data entry corresponding to a scan-pin may include the label "ScanIn" (if the data entry is to be provided to a scan-pin) or "ScanOut" (if the data entry is to be compared to data received from a scan-pin). Such labels may be used to determine the type of pin that each respective data entry corresponds to. Data entries corresponding to scan-pins 113 are then separated and formatted independently from data entries corresponding to non-scan-pins 114, as indicated in blocks 202 and 203, respectively.

Figure 3:
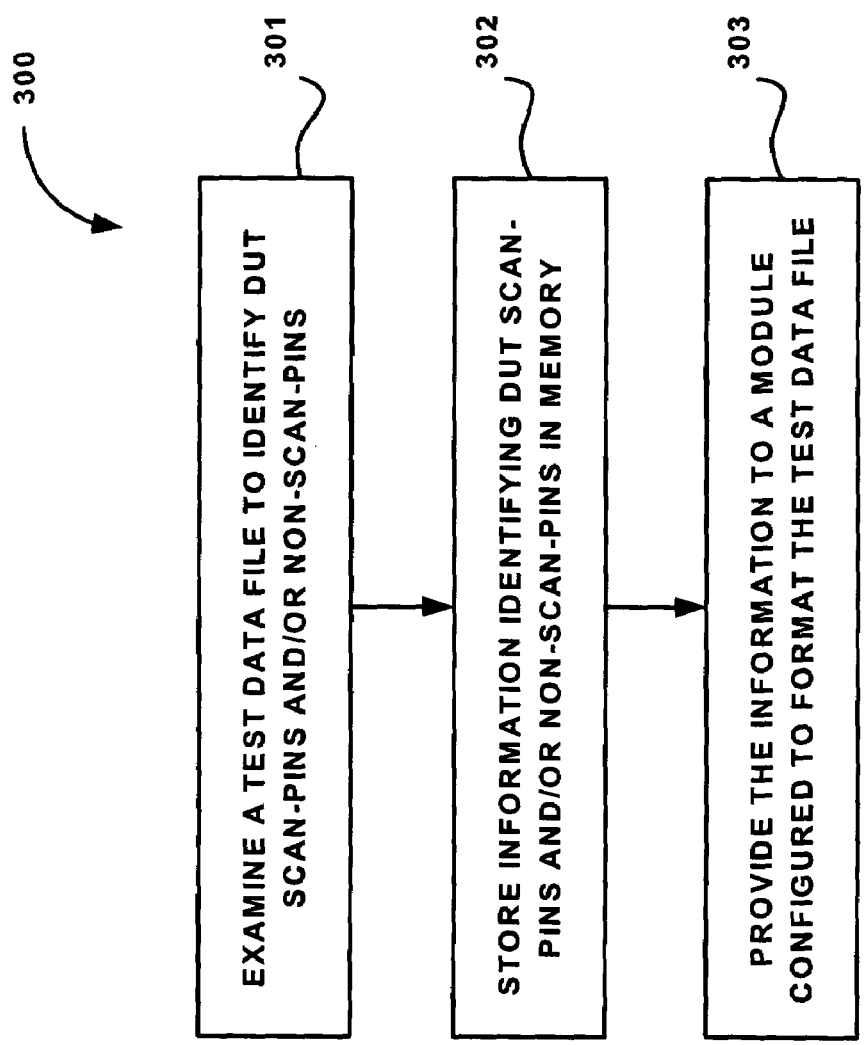
FIG. 3 is a flow chart depicting another embodiment of a testing method.

FIG. 3 is a flow chart depicting an embodiment of a testing method 300. As indicated in block 301, a test data file 101 (FIG. 1B) is examined to identify DUT scan-pins 113 and/or non-scan-pins 114 that are to receive the test data. For example, a DUT pin may be identified as a scan-pin if it is designated to receive a data entry labeled as "ScanIn" or "ScanOut." Information identifying the scan-pins 113 and/or non-scan-pins 114 is then stored in memory, and is provided (in addition to the test data file 101) to a module configured to format the test data file 101, as indicated in blocks 302 and 303, respectively.

Figure 4:
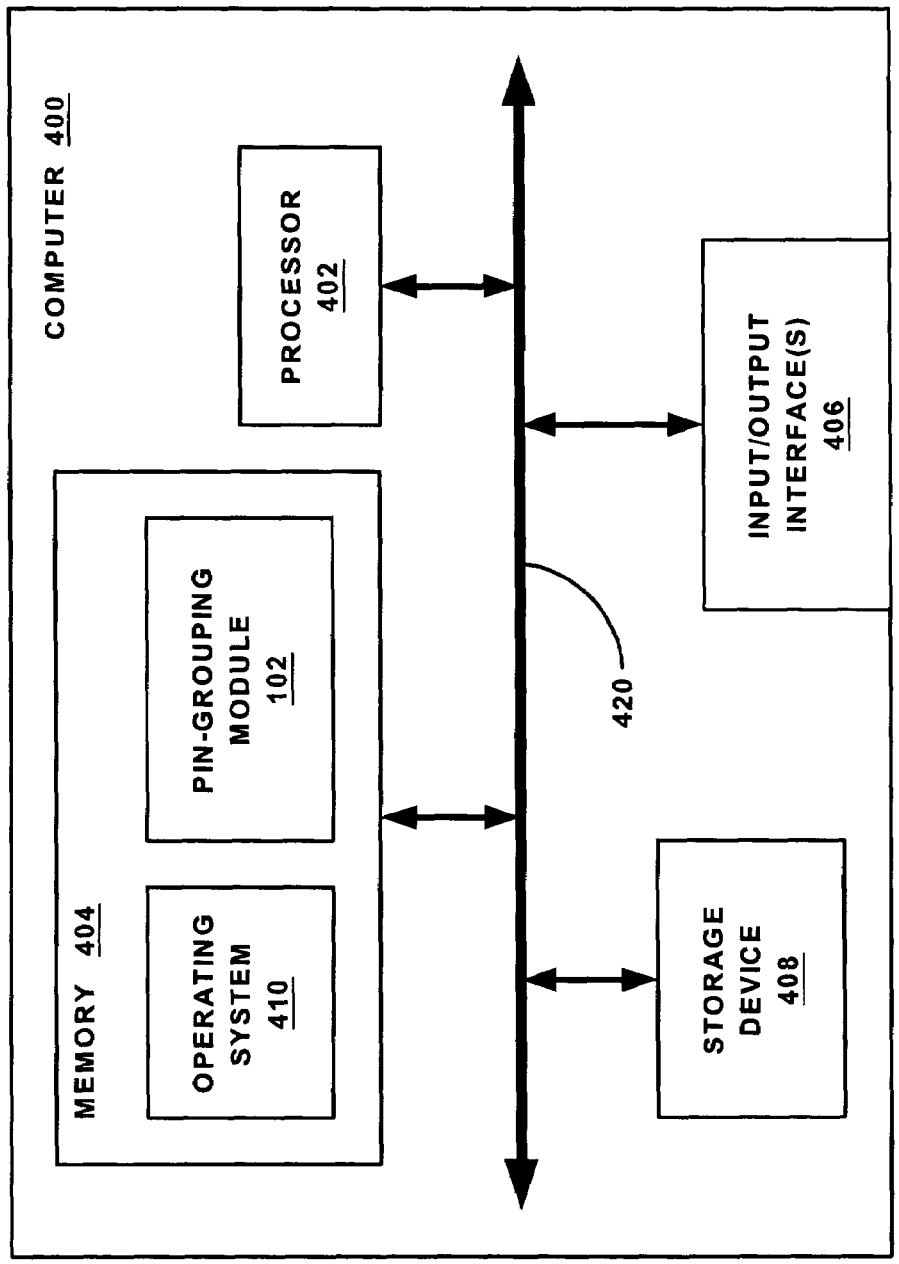
FIG. 4 is a block diagram depicting an embodiment of a computer that can be used to implement the pin-grouping modules shown in FIGS. 1A and 1B.

FIG. 4 is a block diagram depicting an embodiment of a computer 400 that can be used to create entries for a waveform table 108 (FIG. 1). Generally, in terms of hardware architecture, as shown in FIG. 4, the components of the computer 400 include a processor 402, memory 404, input/output (I/O) interfaces 406, and a storage device 408. These components (402, 404, 406, and 408) may be communicatively coupled via a local interface 420, which may comprise, for example, one or more buses or other wired or wireless connections.

The processor 402 is a hardware device for executing software, particularly that stored in memory 404. When the computer 400 is in operation, the processor 402 is configured to execute software stored within the memory 404, to communicate data to and from the memory 404, and to generally control operations of the computer 400 pursuant to the software.

The I/O interfaces 406 may be used to communicate with one or more peripheral devices including, for example, a printer, a copier, a keyboard, a mouse, and/or a monitor, etc. The I/O interfaces 406 may include, for example, a serial port, a parallel port, an IR interface, an RF interface, and/or a universal serial bus (USB) interface.

The memory 404 can include any one or combination of volatile and/or non-volatile memory elements now known or later developed. For example, the memory 404 may comprise random access memory (RAM), read only memory (ROM), a hard disk, a tape, and/or a compact disk ROM (CD-ROM), among others. Note that the memory 404 can have a distributed architecture, where various components are situated remote from one another, but can be accessed by the processor 402.

The software applications in memory 404 include an operating system (OS) 410 and a pin-grouping module 102. The OS 410 essentially controls the execution of the other applications, and provides scheduling, input-output control, file and data management, memory management, and/or communication control, among other functionality. The pin-grouping module 102 may be used identify test data corresponding to scan-pins 113 and/or to separate test-data for scan pins from test-data for non-scan-pins 114. The pin-grouping module 102 may be a source program, an executable program (e.g., object code), a script, or any other entity comprising a set of instructions to be executed.

The pin-grouping module 102 can be embodied in any computer-readable medium for use by or in connection with an instruction execution system, apparatus, or device, such as a computer-based system or a processor-containing system. In the context of this disclosure, a "computer-readable medium" can be any means that can store, communicate, propagate, or transport a program for use by or in connection with the instruction execution system, apparatus, or device. The computer-readable medium can be, for example, among others, an electronic, magnetic, optical, electromagnetic, infrared, or semiconductor system, apparatus, device, or propagation medium now known or later developed.

It should be emphasized that the above-described embodiments are merely possible examples, among others, of the implementations. Many variations and modifications may be made to the above-described embodiments. All such modifications and variations are intended to be included herein within the scope of the disclosure and protected by the following claims.

What is claimed is:

1. A method for testing a device-under-test (DUT), the method comprising:
   examining a test data file that includes test data configured to enable testing the DUT, the test data file including a first plurality of data entries and a second plurality of data entries, the first plurality of data entries corresponding to a first plurality of DUT pins, and the second plurality of data entries corresponding to a second plurality of DUT pins;
   determining whether each of the data entries of the test data file corresponds to a pin of the first plurality of DUT pins or to a pin of the second plurality of DUT pins, wherein the first plurality of DUT pins are scan pins and the second plurality of DUT pins are non-scan pins;
   separating the first plurality of data entries from the second plurality of data entries;
   communicating the first plurality of data entries to the first plurality of DUT pins; and
   communicating the second plurality of data entries to the second plurality of DUT pins.

2. The method of claim 1, wherein the first plurality of data entries have at least one different property than the second plurality of data entries.

3. The method of claim 2, wherein the at least one different property includes timing complexity.

4. The method of claim 2, wherein the at least one different property includes vector data volume.

5. The method of claim 2, wherein the at least one different property includes repetitive data patterns.

6. The method of claim 1, further comprising:
   formatting the first plurality of data entries independently from the second plurality of data entries.

7. The method of claim 1, wherein the test data file is one of a STIL (standard test interface language) file and a WGL (waveform generation language) file.

8. The method of claim 1, further comprising:
   identifying the first plurality of DUT pins; and
   storing information identifying the first plurality of DUT pins in memory.

9. The method of claim 8, further comprising:
   providing the information to a module configured to format the test data file.

10. The method of claim 1, further comprising:
    providing the first plurality of data entries to the first plurality of DUT pins in a first timing domain; and
    providing the second plurality of data entries to the second plurality of DUT pins in a second timing domain;
    wherein the first timing domain is different from the second timing domain.

11. A system for testing a device-under-test (DUT), the system comprising:

memory operative to store a test data file that includes test data configured to enable testing the DUT, the test data file including a first plurality of data entries and a second plurality of data entries, the first plurality of data entries corresponding to a first plurality of DUT pins, and the second plurality of data entries corresponding to a second plurality of DUT pins; and a processor that is programmed to determine whether each of the data entries of the test data file corresponds to a pin of the first plurality of DUT pins or to a pin of the second plurality of DUT pins, wherein the first plurality of DUT pins are associated with scan pins and the second plurality of DUT pins are associated with non-scan pins, the processor further programmed to separate the first plurality of data entries from the second plurality of data entries.

12. The system of claim 11, wherein the processor is further programmed to provide the first plurality of data entries and the second plurality of data entries to a device configured to format the first plurality of data entries independently from the second plurality of data entries.

13. The system of claim 11, wherein the processor is further programmed to identify the first plurality of DUT pins based on information contained in the test data file, and to store information identifying the first plurality of DUT pins in memory.

14. The system of claim 13, wherein the processor is programmed to provide the information identifying the first plurality of DUT pins to a device configured to format test data.

15. A system for testing a device-under-test (DUT), the system comprising:

means for storing a test data file that includes test data configured to enable testing the DUT, the test data file including a first plurality of data entries and a second plurality of data entries, the first plurality of data entries corresponding to a first plurality of DUT pins, and the second plurality of data entries corresponding to a second plurality of DUT pins;

means for determining whether each of the data entries of the test data file corresponds to a pin of the first plurality of DUT pins or to a pin of the second plurality of DUT pins, wherein the first plurality of DUT pins are scan pins and the second plurality of DUT pins are non-scan pins; and means for separating the first plurality of data entries from the second plurality of data entries, wherein the first plurality of data entries are communicated to the first plurality of DUT pins and the second plurality of data entries are communicated to the second plurality of DUT pins.

16. The system of claim 15, wherein the first plurality of data entries have at least one different property than the second plurality of data entries, the at least one different property including timing complexity, vector data volume, and repetitive data patterns.

17. The system of claim 15, further comprising:

means for formatting the first plurality of data entries independently from the second plurality of data entries.

18. The system of claim 15, wherein the test data file is one of a STIL (standard test interface language) file and a WGL (waveform generation language) file.

19. The system of claim 15, wherein the means for formatting is configured to operate in a first timing domain to enable the first plurality of data entries to be provided to the first plurality of DUT pins, and to operate in a second timing domain to enable the second plurality of data entries to be provided to the second plurality of DUT pins, wherein the second timing domain is different from the first timing domain.

20. The system of claim 15, further comprising:

means for identifying the first plurality of DUT pins and for storing the information identifying the first plurality of DUT pins in the storing means.

* * * * *